(12) United States Patent
Chikugawa

(10) Patent No.: US 7,242,156 B2
(45) Date of Patent: Jul. 10, 2007

(54) LIGHT-EMITTING SEMICONDUCTOR DEVICE PULSE DRIVE METHOD AND PULSE DRIVE CIRCUIT

(75) Inventor: Hiroshi Chikugawa, Nara (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 73 days.

(21) Appl. No.: 10/998,714

(22) Filed: Nov. 30, 2004

(65) Prior Publication Data
US 2005/0117367 A1    Jun. 2, 2005

(30) Foreign Application Priority Data
Dec. 1, 2003   (JP)   ............................. 2003-401646
Sep. 3, 2004   (JP)   ............................. 2004-257404

(51) Int. Cl.
*H05B 37/02*    (2006.01)
(52) U.S. Cl. ...................................... 315/308; 315/360
(58) Field of Classification Search ................ 315/246, 315/291, 294, 295, 299, 301, 302, 307, 308, 315/312, 323–324, 360
See application file for complete search history.

(56) References Cited
U.S. PATENT DOCUMENTS 6,016,038 A * 1/2000 Mueller et al. ............. 315/291
6,459,919 B1 * 10/2002 Lys et al. .................... 600/407
6,825,619 B2 * 11/2004 Norris .......................... 315/149
7,022,960 B2 * 4/2006 Yamamoto et al. ......... 250/205
7,038,399 B2 * 5/2006 Lys et al. .................... 315/291

FOREIGN PATENT DOCUMENTS

JP         10-49074 A       2/1998

* cited by examiner

*Primary Examiner*—Thuy Vinh Tran
(74) *Attorney, Agent, or Firm*—Birch, Stewart, Kolasch & Birch, LLP

(57) ABSTRACT

A pulse drive method for a light-emitting semiconductor devices having a plurality of light-emitting elements emitting light at different wavelengths and comprising first lit steps in which light-emitting element(s) of any of the emitted wavelengths is/are made to light as a result of being driven at drive setting(s) for each emitted wavelength, optical output(s) from the lit light-emitting element(s) is/are detected, and the light-emitting element(s) drive setting(s) is/are adjusted based on the detected light-emitting element optical output(s); and unlit steps in which the light-emitting elements of all of the emitted wavelengths are unlit for prescribed unlit time. The first lit steps are carried out in repeated fashion while the driven light-emitting element(s) is/are switched so as to cause the light-emitting element(s) to sequentially light in pulsed fashion in turn by emitted wavelength, and the unlit step respectively intervenes between each pair of successive iterations of the first lit steps.

21 Claims, 8 Drawing Sheets

FIG.1
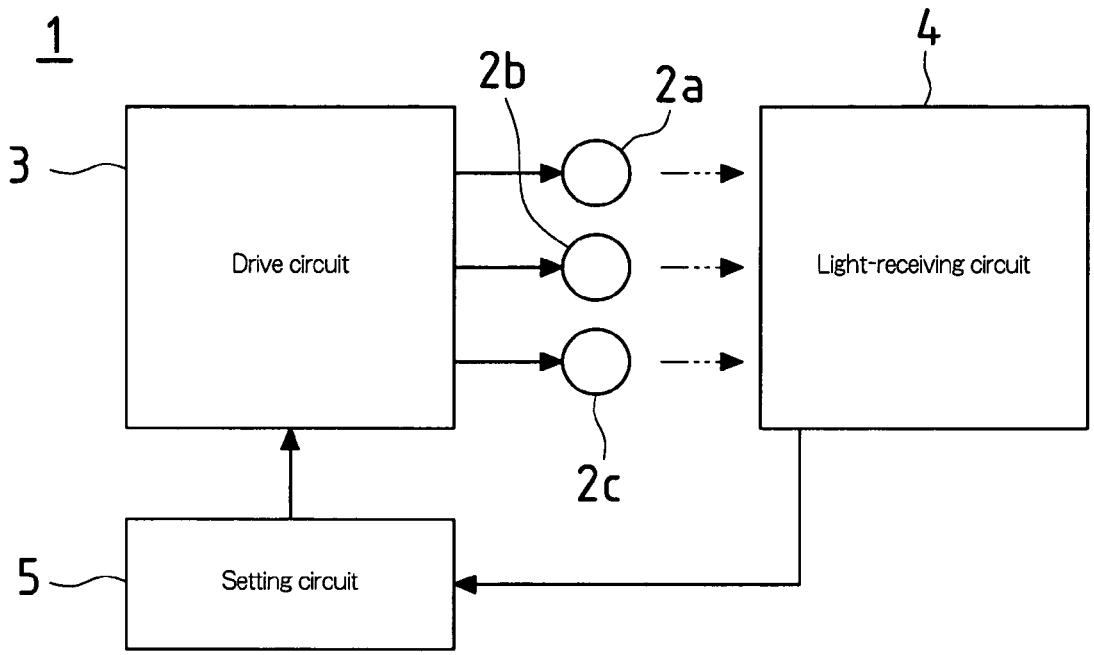
FIG.2 (a)
Optical output of
red light-emitting element
FIG.2 (b)
Optical output of
green light-emitting element
FIG.2 (c)
Optical output of
blue light-emitting element
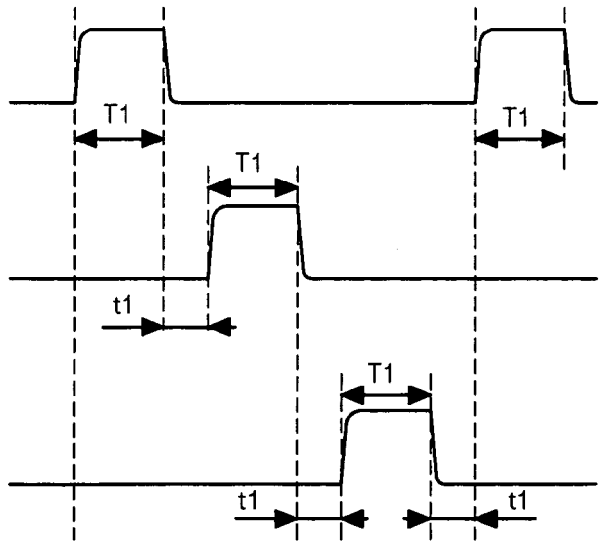

LIGHT-EMITTING SEMICONDUCTOR DEVICE PULSE DRIVE METHOD AND PULSE DRIVE CIRCUIT

This application claims priority under 35 USC 119(a) to patent application Ser. No. 2003-401646 filed in Japan on 1 Dec. 2003 and to patent application No. 2004-257404 filed in Japan on 3 Sep. 2004, the content of both of which is hereby incorporated herein by reference in its entirety.

BACKGROUND OF INVENTION

1. Field of Invention

The present invention primarily pertains to a light-emitting semiconductor device pulse drive method and pulse drive circuit permitting adjustment of luminance and/or adjustment of chromaticity, and capable of being used in apparatuses such as those for liquid crystal backlighting and/or illumination apparatuses employing light emitting diode(s) as white light source(s).

2. Conventional Art

As conventional art for carrying out adjustment of luminance in light-emitting semiconductor devices incorporating light emitting diodes or the like, a color display apparatus in which a light source containing a plurality of light-emitting elements (e.g., light emitting diodes) of different colors that are switched and driven in fixed order and in which control of light intensity is carried out using optical sensor(s) to detect luminance level(s) thereof has, for example, been proposed at Japanese Patent Application Publication Kokai No. H10-49074(1998) (hereinafter "Patent Reference No. 1").

In the context of a color display apparatus carrying out multicolor display and having a light source unit containing a plurality of light-emitting elements of respectively different colors emitting light of different wavelengths and respectively permitting independent adjustment of luminance; a light source drive circuit switching in fixed order the plurality of light-emitting elements of different colors of the light source unit and sequentially supplying respective drive signals thereto; a shutter unit comprising electro-optic shutter elements constituting a plurality of pixels and controlling transmission/blocking of light emitted by color light-emitting elements of the light source unit; and a shutter control circuit supplying, to said shutter unit, color signals corresponding to emission of light from the plurality of color light-emitting elements of the light source unit in synchronous fashion with respect to times at which such emission of light occurs, this color display apparatus comprises optical sensor(s) detecting luminance levels of the respective color light sources; and a light intensity control circuit supplying light intensity control signals to the light source drive circuit in accordance with values detected by said sensor(s); wherein adjustment of respective light source luminance levels is carried out so as to maintain constant balance among luminances of respective color light sources for desired color. As many optical sensors may be provided as the number of emitted colors, or only a single optical sensor may be employed to accommodate same. As method for adjusting luminance, light-emitting element(s) of specific color(s) is/are made to light, optical output therefrom is converted into electricity and is smoothed by means of an integrating circuit, and drive current is controlled through use of the signal obtained.

At this Patent Reference No. 1, however, while a method is described in which a single optical sensor is used in shared fashion for respective emitted colors, there is neither any consideration made nor any specific disclosure with respect to a constitution such as might be suited to obtaining detection output that takes into account the light that is emitted from all of the light-emitting elements in situations, such as with illumination sources, where a multiplicity of light-emitting elements are arranged in distributed fashion.

An illumination apparatus in which the region at which the light-emitting elements are mounted is covered with a transparent resin layer and this transparent resin layer is capable of appropriately guiding, to optical sensor(s), light from a multiplicity of light-emitting elements arranged in distributed fashion has, for example, therefore been proposed at Japanese Patent Application Publication Kokai No. 2002-344031 (hereinafter "Patent Reference No. 2").

This illuminating apparatus comprises a plurality of light emitting diodes arranged in distributed fashion in at least two dimensions; a transparent resin layer integrally covering the plurality of light emitting diodes; an optical detector unit employing optical detector element(s) arranged within and/or on the surface of the transparent resin layer and/or in the vicinity thereof to detect intensity or intensities of light emitted by the light emitting diodes; and a power supply circuit unit controlling driving of the light emitting diodes based on output produced as a result of detection by the optical detector unit; wherein the number of the optical detector element(s) is smaller than the number of the light emitting diodes; and the optical detector element(s) detect intensity or intensities of light emitted by the light emitting diodes after same has propagated thereto through the transparent resin layer.

Furthermore, another example of the conventional art is a method in which red, green, and blue light-emitting elements are sequentially made to light in staggered fashion, there being a fixed time interval between the times at which lighting of each is initiated, and optical output of each color alone is determined by arithmetic processing from the difference in optical output measured at each such occasion. To wit, the red light-emitting element is first made to light and the optical output thereof is measured. The green light-emitting element is next made to light and the optical output produced as a result of combination of the red and green light-emitting elements is measured, and the red output component which was previously measured is subtracted therefrom to obtain the optical output of the green light-emitting element. The blue light-emitting element is, moreover, made to light and the optical output produced as a result of combination of light-emitting elements of all three colors is measured, and the optical output component produced as a result of combination of the red and green light-emitting elements is subtracted therefrom to obtain the optical output of the blue light-emitting element. There is also a method for driving a light-emitting semiconductor device in pulsed fashion wherein arithmetic processing is carried out on optical outputs for respective colors obtained in such fashion and drive current values such as will produce optimum luminance and chromaticity are determined. However, where driving of light-emitting elements, and optical sensor(s) or optical sensor electrical signal conversion circuit(s), are merely sequentially switched in turn by emitted color, such as is the case in the conventional art disclosed at the foregoing Patent Reference No. 1, no consideration is made with respect to circuit delay time and light-emitting element rise and fall times and so forth. This being the case, times during which light-emitting elements of different emitted color are actually lit can partially overlap, and this can cause error in the detection of optical output and decrease in the precision with which luminance is adjusted.

Furthermore, in the conventional art disclosed at Patent Reference No. 1, control of electric current is such that electric current is reduced relative to a prescribed maximum electric current, comparison with the signal obtained after integration and smoothing of optical output permitting driving of electric current to be carried out in stable fashion at a prescribed level. However, in order to cause lighting to occur with good precision by this method, for integration and smoothing it is necessary to constantly synchronize lit time start and end times with electric current control times. That is, integration time is necessary for integration and smoothing, and because there is occurrence of temporal delays, processing time for same must also be taken into consideration, necessitating extremely complex circuit structure. Furthermore, because it is assumed that there is sequential lighting in turn by emitted color, lighting of light-emitting elements is limited to one color at a time. Because light intensity is insufficient as compared with the situation where light-emitting elements of all emitted colors are lit simultaneously, this is not especially suited for achieving the high luminance such as is sought for illumination apparatuses and the like.

In the third and fourth embodiments at the foregoing Patent Reference No. 2, timing charts are disclosed for causing respective red, green, and blue light emitting diodes to sequentially emit light, in which pulsed voltages synchronized with the interval during which a prescribed clock signal goes high are sequentially applied to the respective light emitting diodes. In such case, while it is true that all of the respective light emitting diodes will consequently be unlit throughout the interval during which the clock signal goes low, it is however not the case that the length of this unlit time will have been set in optimal fashion after taking into consideration the circuit delay time and light-emitting element rise and fall times and so forth. Where the unlit time is longer than necessary, this can represent a constraint when attempting to increase duty cycle during pulse drive and can limit ability to achieve increased luminance in illumination apparatuses and the like.

With respect to that which was indicated above as another example of the conventional art, it is in a sense true that simultaneous lighting of all colors is possible at times other than when measurement is taking place and that there should be no constraint with respect to achievement of high luminance. However, because it is necessary to store measured optical output values and to carry out subtraction and other such arithmetic processing, it would be difficult to construct this through employment of only electrical circuitry of relatively small scale. An arithmetic processor capable of accommodating on-chip software or the like would be necessary, making for a complicated and elaborate illumination apparatus.

SUMMARY OF INVENTION

The present invention was conceived in light of such problems in the conventional art, it being an object thereof, in the context of a light-emitting semiconductor devices having a plurality of light-emitting elements emitting light at different wavelengths, to provide a light-emitting semiconductor device pulse drive method and pulse drive circuit making it possible to avoid decrease(s) in precision with which luminance(s) is/are adjusted by preventing occurrence of error(s) in detection of optical output(s) to a great extent in situations such as where light-emitting elements driven in pulsed fashion are sequentially switched in turn by emitted wavelength. It is, moreover, another object thereof to provide a light-emitting semiconductor device pulse drive method and pulse drive circuit permitting adjustment of luminance(s) with high precision through employment of simple circuit structure.

A light-emitting semiconductor device pulse drive method in accordance with one or more embodiments of the present invention, being a pulse drive method for one or more light-emitting semiconductor devices having a plurality of light-emitting elements emitting light at different wavelengths, comprises first lit steps in which at least a portion of the light-emitting elements of any of the emitted wavelengths is or are made to light as a result of being driven at one or more drive settings for each emitted wavelength, at least one optical output from the lit light-emitting element or elements is detected, and at least one of the light-emitting element drive setting or settings is adjusted based on at least one of the detected light-emitting element optical output or outputs; and unlit steps in which the light-emitting elements of all of the emitted wavelengths are unlit for prescribed unlit time; wherein the first lit steps are carried out in repeated fashion while at least a portion of the driven light-emitting element or elements is or are switched so as to cause at least a portion of the light-emitting elements to sequentially light in pulsed fashion in turn by emitted wavelength; and at least one iteration of the unlit steps respectively intervenes between each pair of successive iterations of the first lit steps carried out in repeated fashion.

Here, light-emitting element(s) may, for example, be light emitting diode(s), it being possible to employ a combination of one or more light emitting diodes emitting red light, one or more light emitting diodes emitting green light, and/or one or more light emitting diodes emitting blue light; but the present invention is not limited hereto.

Because light-emitting semiconductor device pulse drive method(s) in accordance with such embodiment(s) of the present invention make it possible, when light-emitting elements being driven are switched in turn by emitted wavelength, to set prescribed unlit time during which all light-emitting elements are unlit, it is possible to avoid mutual overlap between or among times during which light-emitting elements of different emitted wavelengths are actually lit. This makes it possible to prevent occurrence of error(s) in detection of optical output(s) of light-emitting element(s) to a great extent and to avoid decrease(s) in precision with which luminance(s) is/are adjusted.

Furthermore, a light-emitting semiconductor device pulse drive method in accordance with one or more embodiments of the present invention may be such that the prescribed unlit time is of shorter length than any time in the first lit steps during which at least a portion of the light-emitting elements is or are lit.

Here, it is desirable that length of the prescribed unlit time be set to appropriate value which takes into consideration the response and delay time(s) of the actual respective circuit(s) as well as light-emitting element rise and fall times and so forth; this is ordinarily set to time shorter than lit time(s) corresponding to a single drive pulse for each emitted color, and may be set to the smallest time that is sufficient. More specifically, the prescribed unlit time may, for example, be set so as to be not less than 30 microseconds; and moreover, may be set so as to be not more than 20 milliseconds.

Because light-emitting semiconductor device pulse drive method(s) in accordance with such embodiment(s) of the present invention are such that the prescribed unlit time set when light-emitting elements being driven are switched in turn by emitted wavelength may be made shorter than lit time(s) of light-emitting element(s) for each emitted wavelength, it is possible to minimize any decrease in duty cycle(s) during pulse drive that might occur in accompaniment to setting of the prescribed unlit time. This will make it possible to reduce decrease in light-emitting semiconductor device luminance(s). By setting the prescribed unlit time so as to be smallest time that is sufficient, it is possible to keep decrease in light-emitting semiconductor device luminance(s) at extremely low level(s).

Furthermore, a light-emitting semiconductor device pulse drive method in accordance with one or more embodiments of the present invention may be such that switching of at least a portion of the light-emitting elements driven during the first lit steps occurs within the prescribed unlit time; and switching of sensitivity of adjustment of at least one of the light-emitting element drive setting or settings carried out based on at least one of the light-emitting element optical output or outputs detected during the first lit steps occurs within the prescribed unlit time.

Light-emitting semiconductor device pulse drive method(s) in accordance with such embodiment(s) of the present invention permit switching of sensitivity of adjustment of light-emitting element drive setting(s) carried out based on detected light-emitting element optical output(s) in correspondence to switching of driven light-emitting element(s). Furthermore, it is sufficient that such switching occur within prescribed unlit time at unlit step(s), there being no need for rigorous synchronization and/or timing. This permits adjustment for appropriate drive setting(s) in correspondence to driven light-emitting element(s), permits achievement of stable drive method(s) with little error(s), and permits simplification of circuit structure.

Furthermore, a light-emitting semiconductor device pulse drive method in accordance with one or more embodiments of the present invention may be such that detection of at least one of the optical output or outputs from at least a portion of the light-emitting elements during the first lit steps is carried out by using one or more light-receiving elements to monitor at least one of the optical output or outputs from at least a portion of the light-emitting elements; and increase and/or decrease of one or more drive currents driving at least a portion of the light-emitting elements is carried out in analog fashion and in real-time so as to cause at least one of the detected light-emitting element optical output or outputs to be constant.

Light-emitting semiconductor device pulse drive method(s) in accordance with such embodiment(s) of the present invention make it possible for light-emitting element optical output(s) to be rapidly adjusted while light-emitting element(s) of respective emitted wavelength(s) is/are emitting light, making it possible to maintain same at reference level(s) for same. This permits adjustment of luminance(s) with high precision.

Furthermore, a light-emitting semiconductor device pulse drive method in accordance with one or more embodiments of the present invention may be such that detection of at least one of the optical output or outputs from at least a portion of the light-emitting elements during the first lit steps is carried out by using one or more light-receiving elements to monitor at least one of the optical output or outputs from at least a portion of the light-emitting elements; and increase and/or decrease of one or more drive currents driving at least a portion of the light-emitting elements is carried out in stepwise fashion at one or more prescribed time intervals so as to cause at least one of the detected light-emitting element optical output or outputs to be approximately constant.

Light-emitting semiconductor device pulse drive method(s) in accordance with such embodiment(s) of the present invention make it possible for light-emitting element optical output(s) to be adjusted in stepwise fashion at prescribed time interval(s) while light-emitting element(s) of respective emitted wavelength(s) is/are emitting light, making it possible to maintain same near reference level(s) for same. This permits adjustment of luminance(s) with precision corresponding to amount(s) by which adjustment occurs in stepwise fashion.

Furthermore, a light-emitting semiconductor device pulse drive method in accordance with one or more embodiments of the present invention may further comprise storage steps in which information pertaining to at least one drive current at which at least one of the light-emitting element optical output or outputs detected by at least one of the detection circuit or circuits as a result of increase and/or decrease of at least one of the drive current or currents driving at least a portion of the light-emitting elements during the first lit steps is approximately constant is retained and/or stored for each emitted wavelength.

Light-emitting semiconductor device pulse drive method(s) in accordance with such embodiment(s) of the present invention make it possible for information pertaining to drive current(s) at which light-emitting element optical output(s) is/are approximately constant to be stored for each emitted wavelength. Because this makes it possible during emission of light thereafter for driving of respective light-emitting element(s) to be carried out based on stored drive current information, it is possible to obtain stable optical output(s).

Furthermore, a light-emitting semiconductor device pulse drive method in accordance with one or more embodiments of the present invention may further comprise second lit steps in which at least a portion of the light-emitting elements is or are driven in pulsed fashion and is or are made to light based on at least a portion of the drive current information stored for each emitted wavelength at the storage steps. Moreover, at least a portion of the lit time or times for each emitted wavelength of at least a portion of the light-emitting elements during the second lit steps may at least partially overlap.

Light-emitting semiconductor device pulse drive method(s) in accordance with such embodiment(s) of the present invention make it possible to eliminate the need to, each time light-emitting element(s) is/are driven, detect optical output(s) thereof and increase and/or decrease drive current(s) driving same. This makes it possible to eliminate the need to take into consideration occurrence of error(s) in detection of optical output(s), and makes it possible to carry out switching of driven light-emitting element(s) without inclusion of unlit time. Moreover, by employing a circuit structure capable of simultaneously driving light-emitting elements emitting light at a plurality of wavelengths, and by causing lit times of light-emitting elements emitting light at a plurality of wavelengths to at least partially overlap, it will be possible to dramatically increase duty cycle during pulse drive and it will be possible to achieve increased luminance.

Furthermore, a light-emitting semiconductor device pulse drive method in accordance with one or more embodiments of the present invention may further comprise drive current adjustment steps having the first lit steps, same being carried out in repeated fashion for at least one prescribed number of iteration or iterations while at least a portion of the driven light-emitting element or elements is or are switched, the unlit steps, at least one iteration of which intervenes between each pair of successive iterations of the first lit steps, and the storage steps; wherein the drive current adjustment steps and the second lit steps are repeatedly carried out in alternating fashion. Moreover, the drive current adjustment steps and the second lit steps may be repeatedly carried out in alternating fashion with at least one prescribed cyclical periodicity.

Light-emitting semiconductor device pulse drive method(s) in accordance with such embodiment(s) of the present invention make it possible to primarily carry out driving of light-emitting element(s) in accordance with the second lit steps, but to as necessary supplement this with cyclically periodic execution of the drive current adjustment steps. Not only does this make it possible to increase duty cycle during pulse drive and achieve increased luminance, but it also makes it possible to cause optical output(s) of light-emitting element(s) of each emitted wavelength to be continuously maintained with good precision.

Furthermore, a light-emitting semiconductor device pulse drive method in accordance with one or more embodiments of the present invention may be such that at least one of the prescribed cyclical periodicity or periodicities is determined based on at least a portion of the drive current information stored at the storage steps. Moreover, at least a portion of the drive current information stored at the storage steps may be compared to drive current information stored at one or more points in time prior thereto; and at least one of the prescribed cyclical periodicity or periodicities may be changed based on the results of that comparison.

Here, during mutual comparison of drive current information, information pertaining to drive current(s) may be converted to equivalent light intensity or intensities before comparison is made. Furthermore, for example, if difference(s) found as result of comparison is/are not greater than first prescribed value(s), then at least one of the prescribed cyclical periodicity or periodicities might be lengthened; and/or if such difference(s) is/are not less than second prescribed value(s) which is/are larger than at least one of the first prescribed value(s), then at least one of the prescribed cyclical periodicity or periodicities might be shortened. Furthermore, these may be combined in such fashion that if such difference(s) is/are not greater than first prescribed value(s) then at least one of the prescribed cyclical periodicity or periodicities is lengthened, and if such difference(s) is/are not less than second prescribed value(s) then at least one of the prescribed cyclical periodicity or periodicities is shortened.

Light-emitting semiconductor device pulse drive method(s) in accordance with such embodiment(s) of the present invention is/are such that when fluctuation in light-emitting element optical output(s) becomes large for some reason or the other, this causes a concomitantly large change in the drive current information stored at the storage steps, and this in turn causes shortening of the cyclical periodicity or periodicities with which the drive current adjustment steps are carried out. This makes it possible to suppress fluctuation in light-emitting element optical output(s). Furthermore, when fluctuation in light-emitting element optical output(s) becomes small, this causes a concomitantly small change in the drive current information stored at the storage steps, and this in turn causes lengthening of the cyclical periodicity or periodicities with which the drive current adjustment steps are carried out. This makes it possible, to a great extent, to avoid situations in which the drive current adjustment steps are carried out more frequently than necessary and/or situations in which duty cycle during pulse drive is lowered as a consequence thereof.

Alternatively or in addition thereto, in order to achieve one or more of the foregoing and/or other objects, a light-emitting semiconductor device pulse drive circuit in accordance with one or more embodiments of the present invention, being a pulse drive circuit for one or more light-emitting semiconductor devices having a plurality of light-emitting elements emitting light at different wavelengths, comprises one or more drive circuits sequentially driving at least a portion of the light-emitting elements in pulsed fashion in turn by emitted wavelength at one or more drive currents set for each emitted wavelength; one or more detection circuits detecting one or more optical outputs from at least a portion of the light-emitting elements; and one or more setting circuits adjusting one or more drive current settings of at least a portion of the light-emitting elements for each emitted wavelength based on the results of detection carried out by at least one of the detection circuit or circuits; wherein at least one of the drive circuit or circuits respectively carries out setting with respect to prescribed unlit time during which the light-emitting elements of all of the emitted wavelengths are unlit between lit times for each emitted wavelength of at least a portion of the light-emitting elements.

Here, light-emitting element(s) may, for example, be light emitting diode(s), it being possible to employ a combination of one or more light emitting diodes emitting red light, one or more light emitting diodes emitting green light, and/or one or more light emitting diodes emitting blue light; but the present invention is not limited hereto.

Because light-emitting semiconductor device pulse drive circuit(s) in accordance with such embodiment(s) of the present invention make it possible, when light-emitting elements being driven are switched in turn by emitted wavelength, to set prescribed unlit time during which all light-emitting elements are unlit, it is possible to avoid mutual overlap between or among times during which light-emitting elements of different emitted wavelengths are actually lit. This makes it possible to prevent occurrence of error(s) in detection of optical output(s) of light-emitting element(s) to a great extent and to avoid decrease(s) in precision with which luminance(s) is/are adjusted.

Furthermore, a light-emitting semiconductor device pulse drive circuit in accordance with one or more embodiments of the present invention may be such that at least one of the detection circuit or circuits has at least one light-receiving element; detection of at least one of the optical output or outputs from at least a portion of the light-emitting elements is carried out by using at least one of the light-receiving element or elements to monitor at least one of the optical output or outputs from at least a portion of the light-emitting elements; and increase and/or decrease of one or more drive currents driving at least a portion of the light-emitting elements at at least one of the drive circuit or circuits is carried out in stepwise fashion at one or more prescribed time intervals so as to cause at least one of the light-emitting element optical output or outputs detected by at least one of the detection circuit or circuits to be approximately constant.

Here, while optical sensor(s) and the like may be cited as examples of light-receiving element(s), the present invention is not limited hereto. In a specific example of a constitution for appropriately guiding light irradiated from respective light-emitting element(s) to light-receiving element(s), region(s) at which a plurality of light-emitting elements are mounted might be covered with transparent resin layer(s) such that light from the plurality of light-emitting element(s) is guided to light-receiving element(s)

by such transparent resin layer(s), but the present invention is not limited to such constitution(s).

Light-emitting semiconductor device pulse drive circuit(s) in accordance with such embodiment(s) of the present invention make it possible for light-emitting element optical output(s) to be adjusted in stepwise fashion at prescribed time interval(s) while light-emitting element(s) of respective emitted wavelength(s) is/are emitting light, making it possible to maintain same near reference level(s) for same. This permits adjustment of luminance(s) with precision corresponding to amount(s) by which adjustment occurs in stepwise fashion. Furthermore, because such a constitution can be easily implemented through use of digital circuitry of relatively small scale, simplification of circuit structure is made possible.

Furthermore, a light-emitting semiconductor device pulse drive circuit in accordance with one or more embodiments of the present invention may further comprise one or more storage circuits retaining and/or storing at least one drive current value at which at least one of the light-emitting element optical output or outputs detected by at least one of the detection circuit or circuits as a result of increase and/or decrease of at least one of the drive current or currents driving at least a portion of the light-emitting elements is approximately constant.

Light-emitting semiconductor device pulse drive circuit(s) in accordance with such embodiment(s) of the present invention make it possible for drive current value(s) at which light-emitting element optical output(s) is/are approximately constant to be stored for each emitted wavelength. Because this makes it possible during emission of light thereafter for driving of respective light-emitting element(s) to be carried out based on stored drive current value(s), it is possible to obtain stable optical output(s).

Furthermore, a light-emitting semiconductor device pulse drive circuit in accordance with one or more embodiments of the present invention may be such that, with at least one prescribed cyclical periodicity, at least one of the drive current or currents driving at least a portion of the light-emitting elements is increased and/or decreased so as to cause at least one of the light-emitting element optical output or outputs detected by at least one of the detection circuit or circuits to be approximately constant, and information pertaining to at least one drive current at which at least one of the light-emitting element optical output or outputs detected by at least one of the detection circuit or circuits is approximately constant is stored at at least one of the storage circuit or circuits; and at least one of the prescribed cyclical periodicity or periodicities is determined based on at least a portion of the drive current information stored at at least one of the storage circuit or circuits. Moreover, at least a portion of the drive current information stored at at least one of the storage circuit or circuits may be compared to drive current information stored at one or more points in time prior thereto; and at least one of the prescribed cyclical periodicity or periodicities may be changed based on the results of that comparison.

Light-emitting semiconductor device pulse drive circuit(s) in accordance with such embodiment(s) of the present invention is/are such that when fluctuation in light-emitting element optical output(s) becomes large for some reason or the other, this causes a concomitantly large change in at least a portion of the drive current information stored with each cycle of at least one of the prescribed cyclical periodicity or periodicities, in correspondence to which at least one of the prescribed cyclical periodicity or periodicities may be shortened. Furthermore, when fluctuation in light-emitting element optical output(s) becomes small, this causes a concomitantly small change in the drive current information stored with each cycle of at least one of the prescribed cyclical periodicity or periodicities, in correspondence to which at least one of the prescribed cyclical periodicity or periodicities may be lengthened. Because at least one of the prescribed cyclical periodicity or periodicities may be appropriately shortened and/or lengthened in correspondence to magnitude(s) of fluctuation in light-emitting element optical output(s), this makes it possible to suppress fluctuation in light-emitting element optical output(s); and also makes it possible, to a great extent, to avoid lowering of duty cycle during pulse drive.

BRIEF DESCRIPTION OF DRAWINGS

FIG. 1 is a block diagram showing schematic constitution of a light-emitting semiconductor device pulse drive circuit associated with a first embodiment of the present invention.

FIG. 2($a$) is a timing chart indicating optical output of a red light-emitting element in a light-emitting semiconductor device pulse drive circuit associated with the first embodiment of the present invention.

FIG. 2($b$) is a timing chart indicating optical output of a green light-emitting element in a light-emitting semiconductor device pulse drive circuit associated with the first embodiment of the present invention.

FIG. 2($c$) is a timing chart indicating optical output of a blue light-emitting element in a light-emitting semiconductor device pulse drive circuit associated with the first embodiment of the present invention.

FIG. 4($b$) indicates drive current, being a timing chart for explaining adjustment of optical output for a light-emitting element of a particular emitted color in a light-emitting semiconductor device pulse drive circuit associated with the second embodiment of the present invention.

FIG. 6($b$) is a timing chart for explaining adjustment of optical output occurring at the start of lighting, as well as pulse drive taking place thereafter, for a green light-emitting element in a light-emitting semiconductor device pulse drive circuit associated with the third embodiment of the present invention.

FIG. 6($c$) is a timing chart for explaining adjustment of optical output occurring at the start of lighting, as well as pulse drive taking place thereafter, for a blue light-emitting element in a light-emitting semiconductor device pulse drive circuit associated with the third embodiment of the present invention.

DESCRIPTION OF PREFERRED EMBODIMENTS

Figure 3:
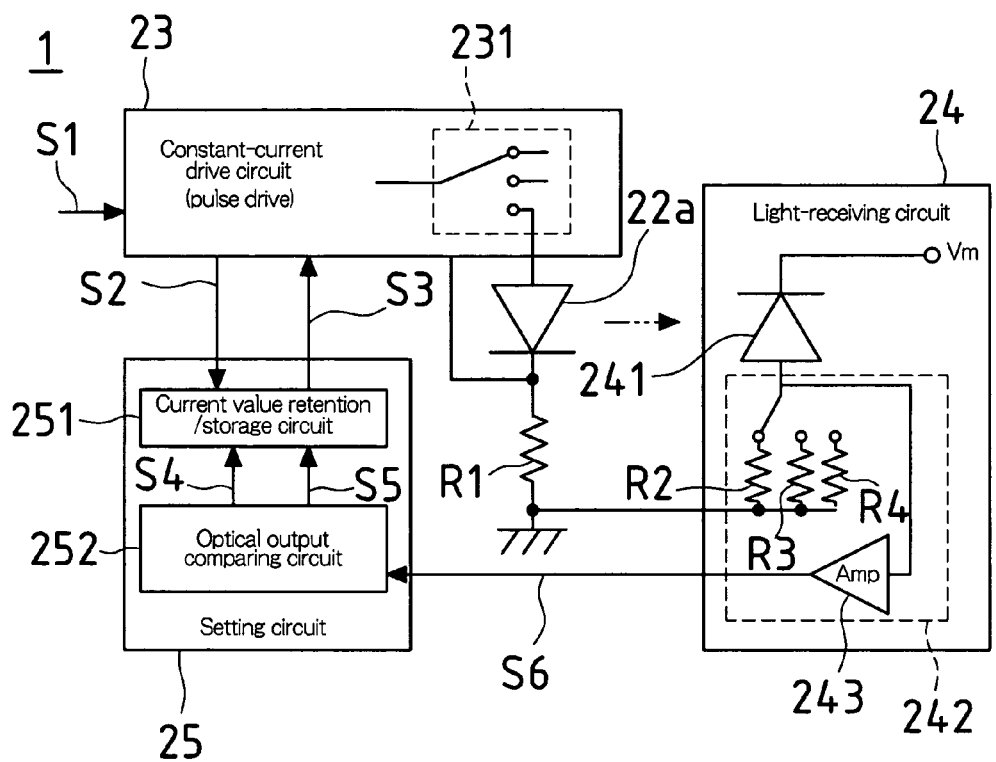
FIG. 3 is a circuit block diagram showing constitution of a light-emitting semiconductor device pulse drive circuit associated with a second embodiment of the present invention.

Below, embodiments of the present invention are described with reference to the drawings.

FIRST EMBODIMENT

FIG. 1 is a block diagram showing schematic constitution of a light-emitting semiconductor device pulse drive circuit associated with a first embodiment of the present invention.

As shown in FIG. 1, light-emitting semiconductor device pulse drive circuit 1 comprises red light-emitting element 2a, green light-emitting element 2b, and blue light-emitting element 2c; drive circuit 3 capable of adjusting optical output by setting drive current for each of these light-emitting elements 2a through 2c; light-receiving circuit 4 having light-receiving element(s), not shown, detecting optical output(s) from light-emitting elements 2a through 2c; and setting circuit 5 adjusting drive current setting(s) of light-emitting elements 2a through 2c based on received-light output(s) from light-receiving circuit 4.

Here, while light emitting diodes may be cited as examples of light-emitting elements 2a through 2c, the present invention is not limited hereto. Furthermore, in a specific example of a constitution for appropriately guiding light irradiated from respective light-emitting elements 2a through 2c to light-receiving element(s) present at light-receiving circuit 4, region(s) at which a plurality of light-emitting elements are mounted might, in the same manner as is disclosed at Patent Reference No. 2, be covered with transparent resin layer(s) such that light from the plurality of light-emitting element(s) is guided to light-receiving element(s) by such transparent resin layer(s), but the present invention is not limited to such a constitution.

Drive circuit 3 carries out pulse drive at respectively different timings so as to cause light-emitting elements 2a through 2c to sequentially emit light in pulsed fashion. It is however not the case that a light-emitting element of a subsequent emitted color is made to light simultaneous with extinguishing of a light-emitting element of any given emitted color, there instead being a prescribed unlit time following extinguishing of the light-emitting element of that given emitted color during which all of the light-emitting elements are unlit, lighting of the light-emitting element of the next emitted color being made to occur following passage of this unlit time. Furthermore, during this unlit time, switching of the light-emitting element that is to be driven occurs internal to drive circuit 3, and switching as appropriate for detection of optical output of the light-emitting element of the next emitted color occurs internal to light-receiving circuit 4.

Here, it is desirable that the unlit time be set to an appropriate value which takes into consideration the response and delay time(s) of the actual respective circuit(s) as well as light-emitting element rise and fall times and so forth; this is ordinarily set to be a time which is shorter than the width corresponding to a single drive pulse for each emitted color, and may be set to the smallest time that is sufficient. More specifically, the unlit time may, for example, be set so as to be not less than 30 microseconds; and moreover, may be set so as to be not more than 20 milliseconds.

While the light-emitting element of any given emitted color is emitting light, received-light output from light-receiving circuit 4 is electrically integrated at setting circuit 5; and the results of integration are compared with a reference value, reference values having been determined in advance for each emitted color. In the event that the results of integration of received-light output yield a value that is lower than the reference value, this is interpreted as meaning that optical output of the light-emitting element is below its reference level, and so the drive current setting is adjusted so as to increase optical output. Conversely, in the event that the results of integration of received-light output yield a value that is higher than the reference value, this is interpreted as meaning that optical output of the light-emitting element is above its reference level, and so the drive current setting is adjusted so as to decrease optical output. While the light-emitting element of any given emitted color is emitting light, light-emitting element optical output is rapidly adjusted, maintaining same at the reference level for same, as a result of the fact that such analog feedback control is carried out in real-time.

FIG. 2(a) through (c) are timing charts indicating optical outputs of light-emitting elements of respective emitted colors in a light-emitting semiconductor device pulse drive circuit associated with the first embodiment of the present invention; FIG. 2(a) indicating optical output of a red light-emitting element, FIG. 2(b) indicating optical output of a green light-emitting element, and FIG. 2(c) indicating optical output of a blue light-emitting element.

As shown at FIG. 2(a) through (c), drive circuit 3 (see FIG. 1) carries out pulse drive so as to cause the red light-emitting element, the green light-emitting element, and the blue light-emitting element to sequentially emit light in pulsed fashion at drive currents set for each emitted color. While the light-emitting element(s) of any given emitted color(s) is/are lit, the optical output(s) thereof is/are detected by light-receiving circuit 4 (see FIG. 1). Detected optical output is at setting circuit 5 (see FIG. 1) compared with a reference level, there being a reference level for each emitted color, and if same differs from the reference level then setting circuit 5 adjusts the drive current setting at drive circuit 3 so as to eliminate the difference therebetween. After passage of prescribed time T1 from the start of lighting, the light-emitting element is extinguished.

Unlit time t1 is then allowed to pass so that there will be an unlit time during which all of the light-emitting elements are unlit; at which time switching so as to allow driving of the light-emitting element of the next emitted color occurs internal to drive circuit 3, and switching as appropriate for detection of optical output of the light-emitting element of the next emitted color occurs internal to light-receiving circuit 4.

After passage of unlit time t1, the light-emitting element of the next emitted color is made to light, and adjustment is carried out so as to cause the optical output thereof to be the reference level for same. After passage of prescribed time T1 from the start of lighting, the light-emitting element is extinguished.

By thereafter repeating such processing, it is possible to carry out pulse drive so as to cause the red light-emitting element, the green light-emitting element, and the blue light-emitting element to sequentially emit light in pulsed fashion.

Note that because of the extremely rapid response of light emitting diodes and other such light-emitting elements, response delay and the like cannot easily be understood by looking at an ordinary timing chart. At FIG. 2(a) through (c), to facilitate explanation of the effect of response delay and so forth, this is therefore depicted in exaggerated fashion at certain locations in the direction of the time axis. Furthermore, while it is ordinarily the case that unlit time t1 may be set so as to be sufficiently small relative to prescribed time T1 corresponding to the time during which light of a given emitted color is emitted, for the purpose of these diagrams an example is depicted in which a rather large unlit time t1 is chosen so as to facilitate explanation.

In accordance with the first embodiment constituted as described above, because of the presence of a prescribed unlit time during which all of the light-emitting elements are unlit following extinguishing of the light-emitting element of one emitted color before the light-emitting element of the next emitted color is made to light, causes of error in detection of optical output due to overlap between or among lit times of light-emitting elements of a plurality of emitted colors can be prevented to a great extent and adjustment of light-emitting semiconductor device luminance and so forth can be carried out with high precision. Furthermore, because switching as appropriate for detection of optical output of the light-emitting element of the next emitted color can take place during this unlit time, achievement of a stable drive method with little error is permitted. Moreover, because the only restriction is that such switching occur within the prescribed unlit time, there is no need for rigorous synchronization and/or timing, permitting simplification of circuit structure.

In addition, by setting the unlit time to be smallest time that is sufficient, it is possible to hold to an extremely low level any decrease in duty cycle during pulse drive that might occur in accompaniment to setting of unlit time.

SECOND EMBODIMENT

FIG. 3 is a circuit block diagram showing constitution of a light-emitting semiconductor device pulse drive circuit associated with a second embodiment of the present invention.

As shown in FIG. 3, light-emitting semiconductor device pulse drive circuit 1 comprises red light-emitting element 22a, green light-emitting element 22b, and blue light-emitting element 22c (note, however, that at FIG. 3 only red light-emitting element 22a is shown, depiction of the other two light-emitting elements being omitted therein); constant-current drive circuit 23 having light-emitting element switching circuit 231; light-receiving circuit 24 having light-receiving element 241 and gain switching circuit 242; and setting circuit 25 having current value retention/storage circuit 251 and optical output comparing circuit 252.

Constant-current drive circuit 23 has light-emitting element switching circuit 231 for selectively making connection to the anode of any one light-emitting element among light-emitting elements 22a through 22c, and drives whichever among light-emitting elements 22a through 22c is selected in pulsed fashion with constant current. Constant-current values for pulse drive can be set in stepwise fashion in prescribed increments (e.g., in units of 0.1 mA) for each of light-emitting elements 22a through 22c. Because optical outputs of light-emitting elements 22a through 22c correspond to values of constant currents at which these are driven, it is possible, by adjusting the values to which these constant currents are set, to respectively adjust the optical outputs from light-emitting elements 22a through 22c. Immediately after constant-current drive circuit 23 is reset due to input thereto of reset signal S1, constant-current values for each of light-emitting elements 22a through 22c are all initialized to "0"; and during emission of light by light-emitting elements 22a through 22c, constant-current value settings are adjusted by current setting signal S3 from setting circuit 25 so as to cause respective optical outputs therefrom to be at or near reference levels for same.

The anode of red light-emitting element 22a (e.g., a light emitting diode) is connected to light-emitting element switching circuit 231 of constant-current drive circuit 23, and the cathode thereof is connected to constant-current drive circuit 23 and also to ground by way of resistor R1 (similar description likewise applies to green light-emitting element 22b and blue light-emitting element 22c, which are not depicted in the drawing). When the cathode thereof goes low due to action of constant-current drive circuit 23, constant current flows through light-emitting element switching circuit 231 and through whichever one among light-emitting elements 22a through 22c is connected thereto at that point in time.

Light-receiving circuit 24 has light-receiving element(s) 241 (e.g., optical sensor(s)), which detect optical output(s) from light-emitting elements 22a through 22c, and has gain switching circuit 242. The cathode of light-receiving element 241 is connected to power supply VM, and the anode thereof is connected to gain switching circuit 242. Gain switching circuit 242 selectively connects light-receiving element 241 to ground by way of any one among three resistors R2, R3, and R4 so as to permit switching of gain in correspondence to light-emitting elements 22a through 22c. Photoelectric currents flow through light-receiving element 241 in correspondence to optical outputs from light-emitting elements 22a through 22c, these photoelectric currents being converted to voltages by means of the resistors which connect the anode of light-receiving element 241 to ground. The voltages obtained as a result of conversion are, by way of amplifier 243, output, as received-light output S6, to optical output comparing circuit 252 of setting circuit 25.

Setting circuit 25 has optical output comparing circuit 252 and current value retention/storage circuit 251. At optical output comparing circuit 252, received-light output S6 output from light-receiving circuit 24 is compared to reference values determined in advance for each of light-emitting elements 22*a* through 22*c*. In the event that received-light output S6 is lower than the reference value, this is interpreted as meaning that optical output is below its reference level, and so step-up signal S4 is output to current value retention/storage circuit 251 so as to increase optical output. Conversely, in the event that received-light output S6 is higher than the reference value, this is interpreted as meaning that optical output is above its reference level, and so step-down signal S5 is output to current value retention/storage circuit 251 so as to decrease optical output.

At current value retention/storage circuit 251, constant-current values for each of light-emitting elements 22*a* through 22*c* are retained; and current setting signal S3, corresponding to retained constant-current value(s), is output therefrom to constant-current drive circuit 23. Constant-current values for each of light-emitting elements 22*a* through 22*c* retained at current value retention/storage circuit 251 are increased by one step in correspondence to step-up signal S4 from optical output comparing circuit 252, and are decreased by one step in correspondence to step-down signal S5 therefrom. By repeatedly carrying out such stepwise increase and/or decrease of constant-current values at fixed time intervals (digital feedback control), it is possible to adjust constant-current values for pulse drive as produced by constant-current drive circuit 23, it is possible to adjust optical output for each of light-emitting elements 22*a* through 22*c*, and it is possible to maintain same at or near respective reference levels for same. Furthermore, current value retention/storage circuit 251 is capable of respectively latching the constant-current value at the point in time in question for each of light-emitting elements 22*a* through 22*c* in correspondence to current latch signal S2 output from constant-current drive circuit 23, permitting restoration of latched constant-current value(s) as necessary.

Note that instead of performing rigorous comparison of magnitudes of received-light output S6 and reference value(s) and then increasing and/or decreasing drive current, it is alternatively possible to carry out processing such that drive current is maintained as is so long as the difference between received-light output S6 and the reference value is, for example, within a prescribed range that is chosen so as to be sufficiently small. By so doing, it will be possible to avoid situations such as can occur when drive current is increased and/or decreased in repeated fashion more frequently than necessary, possibly resulting in phenomena such as that in which optical output(s) of light-emitting elements 22*a* through 22*c* oscillate over extremely narrow range(s) straddling reference level(s).

Figure 4A:
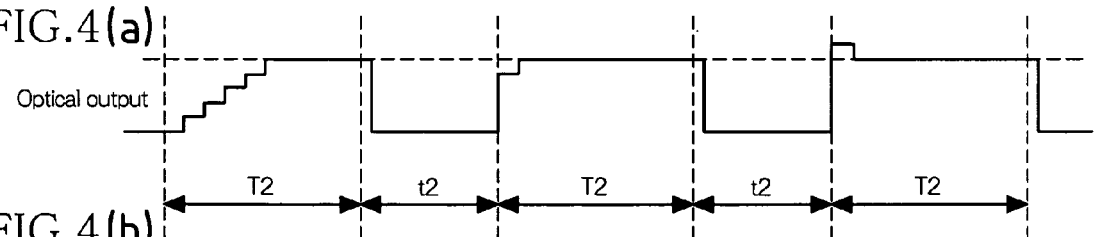
FIG. 4($a$) indicates optical output, being a timing chart for explaining adjustment of optical output for a light-emitting element of a particular emitted color in a light-emitting semiconductor device pulse drive circuit associated with the second embodiment of the present invention.
Figure 4B:
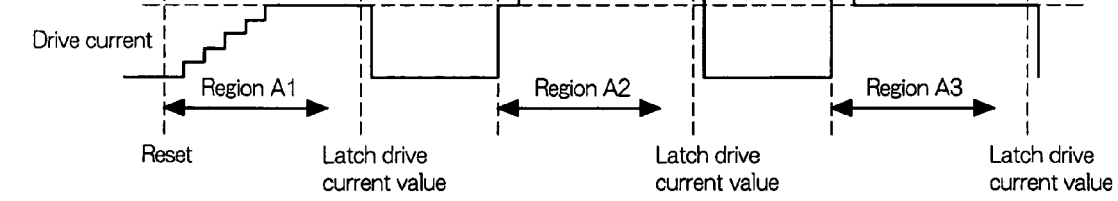

FIGS. 4(*a*) and (*b*) are timing charts for explaining adjustment of optical output for a light-emitting element of a particular emitted color in a light-emitting semiconductor device pulse drive circuit associated with the second embodiment of the present invention; FIG. 4(*a*) indicating optical output, and FIG. 4(*b*) indicating drive current.

As shown at region A1 at FIGS. 4(*a*) and (*b*), the drive current driving the light-emitting element is, immediately following reset, initialized to "0". This being the case, optical output of the light-emitting element will, immediately following the start of lighting, also be "0". Thereafter, while received-light output S6 at light-receiving circuit 24 (see FIG. 3) is smaller than the reference level, drive current is at regular time intervals increased in stepwise fashion in increments of a prescribed amount. Received-light output S6 eventually reaches a point where it is near the reference level, drive current thereafter being maintained at a constant value. Toward the end of the lit time of the light-emitting element (after passage of prescribed time T2 from the start of lighting), the drive current value at that point in time is latched and is retained/stored.

The drive current value that is latched here will be used as the value to which drive current is initialized during resumption of lighting when the light-emitting element that was emitting light at that point in time is next lit (after passage of unlit time t2 from the point in time when latching of the drive current value occurred), and increase and/or decrease of drive current in correspondence to received-light output S6 will begin with that initialized value. This being the case, because, during the second and subsequent times that lighting occurs, drive current will be initialized to a value which is such that optical output is already near the reference level, or is at least relatively close thereto, with increase and/or decrease of drive current thereafter causing optical output to rapidly reach and be maintained at a value near the reference level, it is possible to obtain stable optical output.

Region A2 at FIGS. 4(*a*) and (*b*) indicates a situation in which, upon initiation of lighting beginning with the drive current value that was latched during the preceding occurrence of lighting, optical output has for some reason or the other become slightly lower than the reference level. This being the case, the value of the drive current is increased in stepwise fashion; and in the present case, increasing drive current value by only a single step causes optical output to reach a value near the reference level, and drive current value is thereafter maintained thereat. Toward the end of the lit time (after passage of prescribed time T2 from the start of lighting), the drive current value at that point in time is latched and is retained/stored.

Moreover, region A3 at FIGS. 4(*a*) and (*b*) indicates a situation in which, upon initiation of lighting beginning with the drive current value that was latched during the preceding occurrence of lighting, optical output has for some reason or the other become slightly higher than the reference level. This being the case, the value of the drive current is decreased in stepwise fashion; and in the present case, decreasing drive current value by only a single step causes optical output to reach a value near the reference level, and drive current value is thereafter maintained thereat. Toward the end of the lit time (after passage of prescribed time T2 from the start of lighting), the drive current value at that point in time is latched and is retained/stored.

Figure 5:
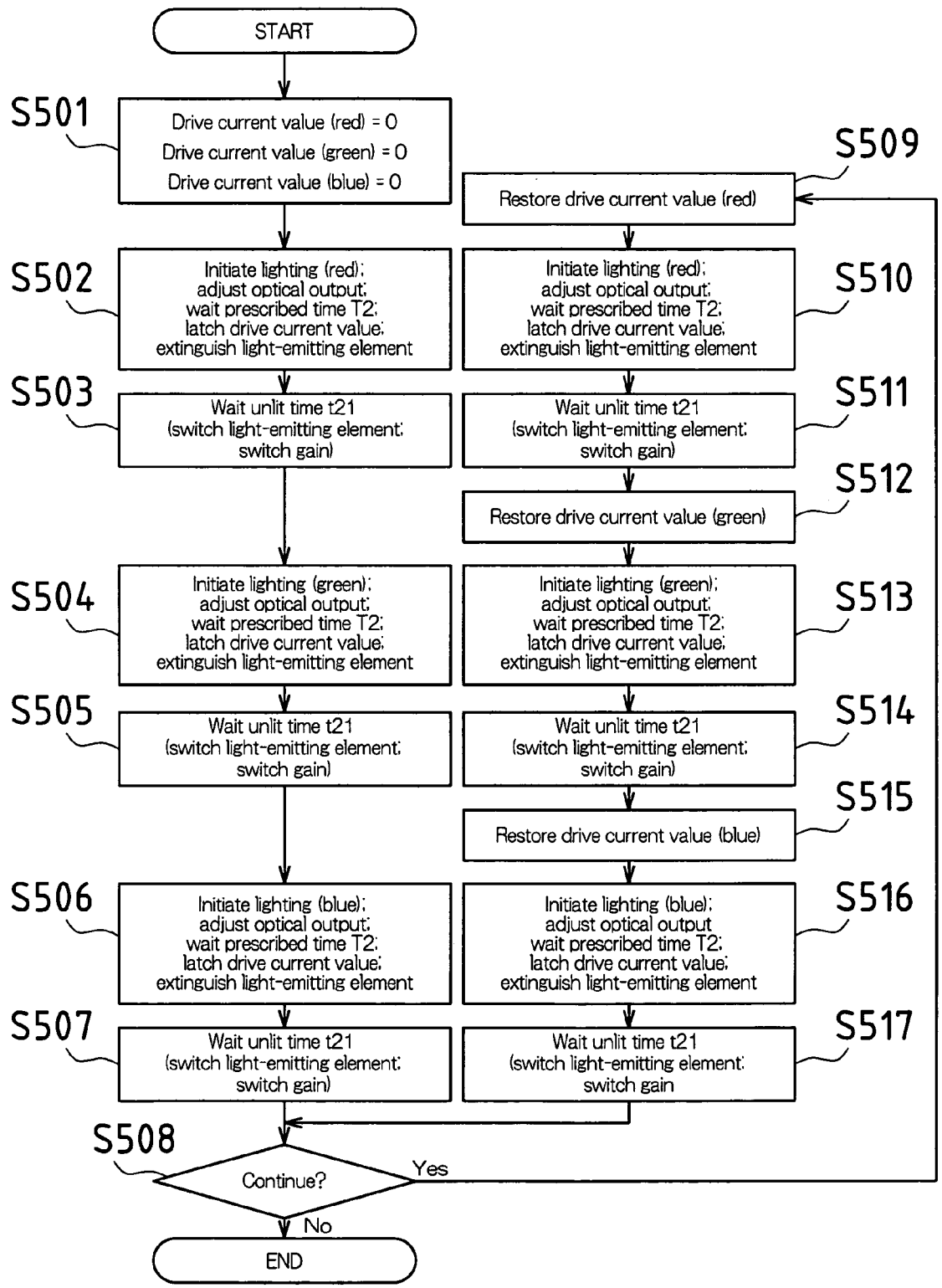
FIG. 5 is a flowchart indicating, in schematic fashion, processing in connection with driving of light-emitting elements of respective emitted colors in a light-emitting semiconductor device pulse drive circuit associated with the second embodiment of the present invention.

FIG. 5 is a flowchart indicating, in schematic fashion, processing in connection with driving of light-emitting elements of respective emitted colors in a light-emitting semiconductor device pulse drive circuit associated with the second embodiment of the present invention. Processing in accordance with this flowchart will make it possible to respectively obtain timing charts for light-emitting elements of each respective emitted color which are similar to those shown at FIGS. 4(*a*) and (*b*). In specific terms, such processing may be readily implemented through employment of electrical circuitry and so forth of relatively small scale, there being no particular need for complex circuitry for arithmetic processing, software, and/or the like.

(1) Initial Lighting of Light-Emitting Elements of Respective Emitted Colors Immediately Following Reset As shown in FIG. 5, processing during initial lighting of respective emitted colors immediately following reset is carried out at steps S501 through S507.

Drive current values of light-emitting elements 22a through 22c of respective emitted colors (see FIG. 4(a) and (b)) are all first initialized to "0" (step S501).

Lighting of red light-emitting element 22a is then initiated, the drive current value thereof being increased and/or decreased in order to adjust optical output so as to be at or near the reference level for same. After passage of prescribed time T2 from the start of lighting, drive current value is latched and red light-emitting element 22a is extinguished (step S502).

Unlit time t21 is then allowed to pass, during which time switching of connections so as to allow emission of light by green light-emitting element 22b is carried out, and switching to a gain appropriate for detection of optical output thereof is also carried out (step S503).

After passage of unlit time t21, lighting of green light-emitting element 22b is initiated, the drive current value thereof being increased and/or decreased in order to adjust optical output so as to be at or near the reference level for same. After passage of prescribed time T2 from the start of lighting, drive current value is latched and green light-emitting element 22b is extinguished (step S504).

Unlit time t21 is then allowed to pass, during which time switching of connections so as to allow emission of light by blue light-emitting element 22c is carried out, and switching to a gain appropriate for detection of optical output thereof is also carried out (step S505).

After passage of unlit time t21, lighting of blue light-emitting element 22c is initiated, the drive current value thereof being increased and/or decreased in order to adjust optical output so as to be at or near the reference level for same. After passage of prescribed time T2 from the start of lighting, drive current value is latched and blue light-emitting element 22c is extinguished (step S506).

Unlit time t21 is then allowed to pass, during which time switching of connections so as to allow emission of light by red light-emitting element 22a is carried out, and switching to a gain appropriate for detection of optical output thereof is also carried out (step S507).

After passage of unlit time t21, determination is made as to whether processing should be continued further (step S508); in the event that processing is to be continued then processing proceeds to step S509, but if processing is not to be continued then processing terminates.

(2) Second and Subsequent Lighting of Respective Emitted Colors

Processing during second and subsequent lightings of respective emitted colors is carried out at steps S509 through S517; except for the fact that at steps S509, S512, and S515 drive current values latched for light-emitting elements of each respective emitted color are respectively restored and used as values to which drive current is initialized, processing is identical to that carried out at the respective steps at steps S502 through S507.

In accordance with the second embodiment constituted as described above, because of the presence of a prescribed unlit time during which all of the light-emitting elements are unlit following extinguishing of the light-emitting element of one emitted color before the light-emitting element of the next emitted color is made to light, causes of error in detection of optical output due to overlap between or among lit times of light-emitting elements of a plurality of emitted colors can be prevented to a great extent and adjustment of light-emitting semiconductor device luminance and so forth can be carried out with high precision. Furthermore, because switching as appropriate for detection of optical output of the light-emitting element of the next emitted color can take place during this unlit time, achievement of a stable drive method with little error is permitted. Moreover, because the only restriction is that such switching occur within the prescribed unlit time, there is no need for rigorous synchronization and/or timing, permitting simplification of circuit structure. Furthermore, because drive current values at times when optical outputs during lighting of each emitted color have reached values near reference levels for same are stored and the stored drive current values are used to initiate driving when lighting is thereafter resumed, it is possible to cause optical outputs to rapidly reach and be maintained at values near reference values for same, as a result of which it is possible to obtain stable optical outputs.

THIRD EMBODIMENT

At both the first and second embodiments, while light-emitting elements are sequentially driven in pulsed fashion in turn by emitted color, with such pulse drive there is a limit to the duty cycle at which light-emitting elements of respective emitted colors can be lit. For example, where light-emitting elements of three emitted colors are driven for equal times, the maximum attainable lit duty cycle will not be more than ⅓; but when the unlit time during which light-emitting elements of all respective emitted colors are unlit is taken into consideration, lit duty cycle is decreased still further, meaning that overall optical output is constrained hereby. Where there is a desire to increase optical output by even a small amount, so long as it is not required that luminance be adjusted closely enough to necessitate adjustment of optical output with each pulse with which light-emitting elements of respective emitted colors are driven or in other such situations, adjustment of optical outputs of light-emitting elements of respective emitted colors might, for example, be carried out only at the initiation of driving and/or upon being so directed by a reset signal from the exterior. By adopting a constitution in which adjustment of optical output is not carried out during the driving taking place thereafter, because there will be no need to take into consideration occurrence of error(s) in detection of optical output(s), setting(s) with respect to unlit time need not be carried out when carrying out switching of light-emitting elements. Moreover, simultaneous lighting of light-emitting elements of a plurality of colors will also be possible, permitting dramatic increase in lit duty cycle.

The third embodiment of the present invention, in which such a constitution is adopted, is therefore described below. Note that because, except for the features mentioned below, the third embodiment is identical to the second embodiment, like constituent members will be assigned like reference numerals and only those aspects that are different therefrom will be described.

Instead of the constant-current drive circuit 23 present in the second embodiment (see FIG. 3), the light-emitting semiconductor device pulse drive circuit associated with the third embodiment of the present invention is provided with a constant-current circuit capable of driving light-emitting elements of respective emitted colors in respectively independent fashion and also capable of simultaneously driving light-emitting elements of a plurality of colors. The third embodiment is in other respects similar to the second embodiment.

Figure 6:
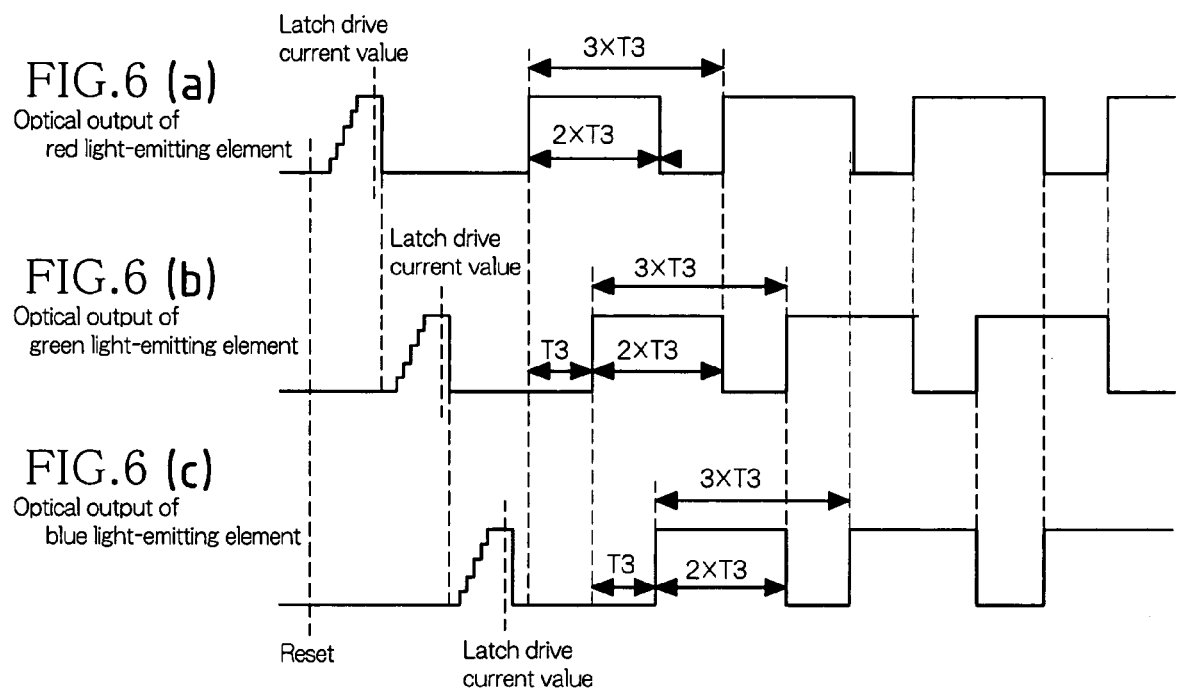
FIG. 6($a$) is a timing chart for explaining adjustment of optical output occurring at the start of lighting, as well as pulse drive taking place thereafter, for a red light-emitting element in a light-emitting semiconductor device pulse drive circuit associated with a third embodiment of the present invention.

FIG. 6(a) through (c) are timing charts for explaining adjustment of optical output occurring at the start of lighting, as well as pulse drive taking place thereafter, for light-emitting elements of respective emitted colors in a light-emitting semiconductor device pulse drive circuit associated with the third embodiment of the present invention; FIG. 6(a) indicating optical output of a red light-emitting element, FIG. 6(b) indicating optical output of a green light-emitting element, and FIG. 6(c) indicating optical output of a blue light-emitting element.

As shown at FIG. 6(a) through (c), following reset, the red light-emitting element is first made to light, and adjustment of the optical output thereof is carried out. Following completion of adjustment, the drive current value at that point in time is latched and the red light-emitting element is extinguished. Next, a prescribed unlit time is allowed to pass, the green light-emitting element is made to light, and adjustment of the optical output thereof is carried out. Following completion of adjustment, the drive current value at that point in time is latched and the green light-emitting element is extinguished. A prescribed unlit time is then allowed to pass, the blue light-emitting element is made to light, and adjustment of the optical output thereof is carried out. Following completion of adjustment, the drive current value at that point in time is latched and the blue light-emitting element is extinguished. At this point, adjustment of optical outputs of light-emitting elements of each respective emitted color will have been completed.

From this point on, driving is carried out in pulsed fashion, the period of the pulse being three times prescribed time T3, and pulsewidth being two times prescribed time T3, with lighting of the light-emitting element of a subsequent emitted color being initiated at the point in time which is halfway through the lit time of the light-emitting element of any given emitted color; i.e., when prescribed time T3 has elapsed. As drive current values, drive current values latched when optical outputs of light-emitting elements of each respective emitted color were adjusted following reset are respectively restored and used. Note that pulse period(s), pulsewidth(s), emission timing(s), and so forth indicated herein are merely presented by way of example, and the present invention is not limited thereto.

To produce the timing charts indicated at FIG. 6(a) through (c), first with respect to adjustment of optical outputs of light-emitting elements of each respective emitted color, processing similar to that at steps S501 through S507 at the flowchart in FIG. 5 might be carried out. Thereafter with respect to pulse drive of light-emitting elements of respective emitted colors, a constitution might be adopted which is capable of executing in parallel the sequence of processing consisting of restoration of drive current value, initiation of lighting, waiting to allow passage of prescribed time, and extinguishing of the light-emitting element for each emitted color, with execution of such sequences of processing being carried out in repeated fashion and in parallel, timing being such that initiation thereof is staggered by prescribed time T3.

In accordance with the third embodiment constituted as described above, in addition to action and effect as at the second embodiment, it is possible, following start of pulse drive, to carry out simultaneous lighting of light-emitting elements of a plurality of colors. This makes it possible to dramatically increase lit duty cycle and to achieve increased luminance.

FOURTH EMBODIMENT

Figure 7:
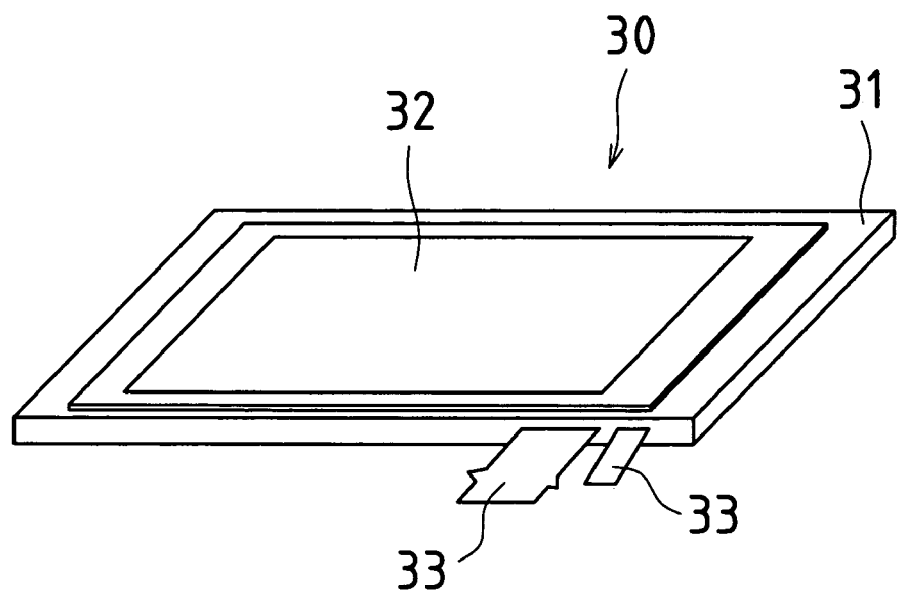
FIG. 7 is a drawing showing external appearance of a typical backlight unit employing light emitting diodes.
Figure 8:
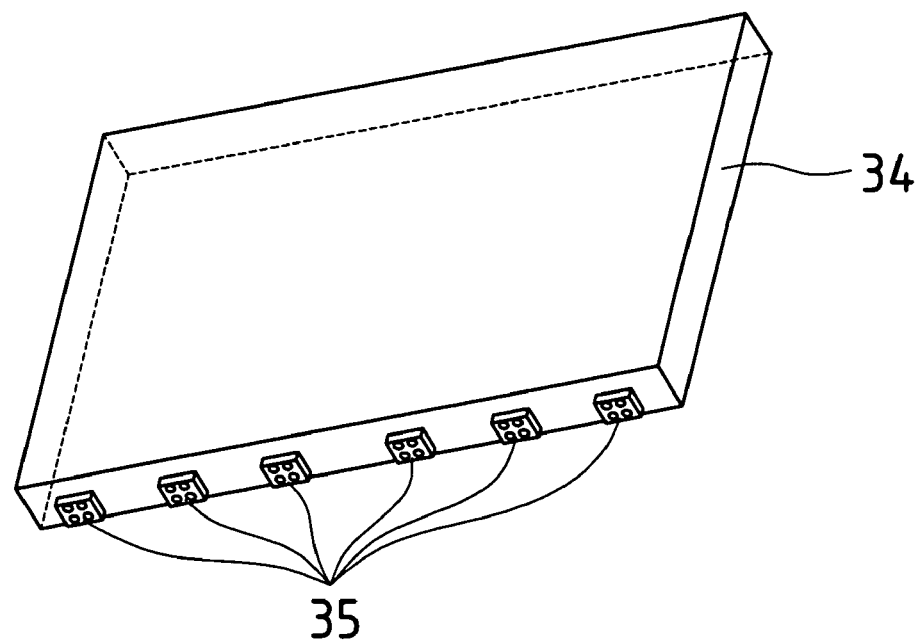
FIG. 8 is a drawing showing, in schematic fashion, positional relationship between chip-type light emitting diodes and a light guide plate such as might be employed in the backlight unit shown in FIG. 7.

FIG. 7 is a drawing showing external appearance of a typical backlight unit 30 employing light emitting diodes. FIG. 8 is a drawing showing, in schematic fashion, positional relationship between chip-type light emitting diodes 35 and light guide plate 34 such as might be employed in such backlight unit 30.

As shown in FIGS. 7 and 8, backlight unit 30 has flat rectangular holder 31; reflector film, light guide plate 34, diffuser film, lens film (these being not shown in FIG. 7; only light guide plate 34 being shown in FIG. 8), and so forth being stacked in order from the bottom within this holder 31, with liquid crystal panel 32 being incorporated therein at the topmost layer thereof. Furthermore, within backlight unit 30, a plurality of chip-type light emitting diodes 35 mounted on flexible printed circuit 33 are arranged so as to face one side of light guide plate 34 (see FIG. 8 for positional relationship), light being irradiated from these chip-type light emitting diodes 35 toward the central direction of light guide plate 34. Moreover, drive current is supplied to these chip-type light emitting diodes 35 by way of a portion (power supply and ground traces) of flexible printed circuit 33 which protrudes to the exterior from the interior of holder 31.

Light emitting diodes are typically such that optical output and wavelength thereof fluctuate as operating temperature increases. This being the case, it will be necessary to reduce fluctuation in color to a great extent when light emitting diodes are used for illumination, or when light emitting diodes are used in backlights for monitors in personal computers and/or liquid crystal television equipment, or in other such situations where high quality is demanded with respect to color. Furthermore, where light sources of a plurality of different wavelengths are combined, fluctuation in the relative mixture of optical outputs of respective wavelengths will cause fluctuation in color.

Figure 9:
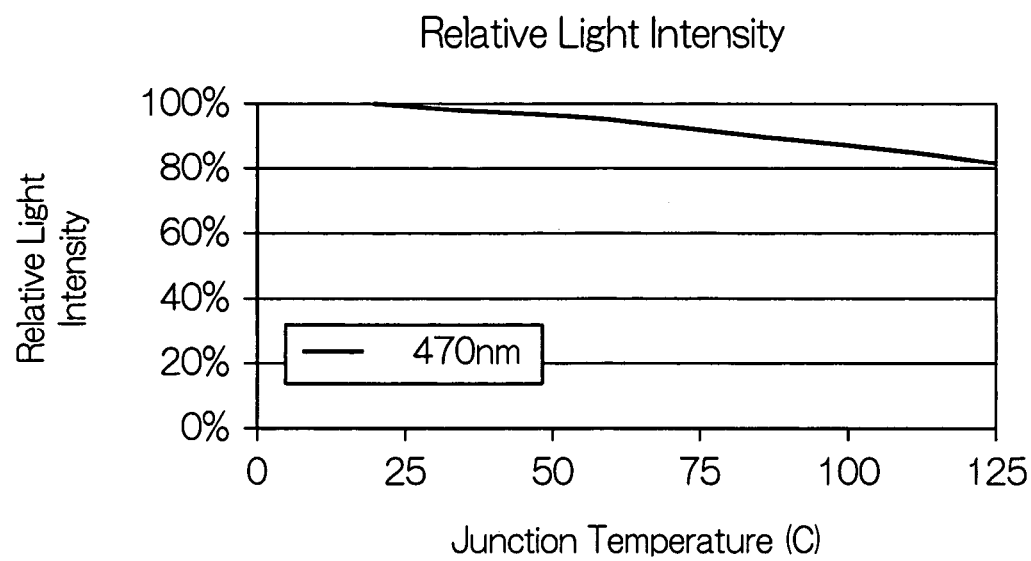
FIG. 9 is a graph showing fluctuation in optical output as a function of junction temperature for a blue light emitting diode.
Figure 10:
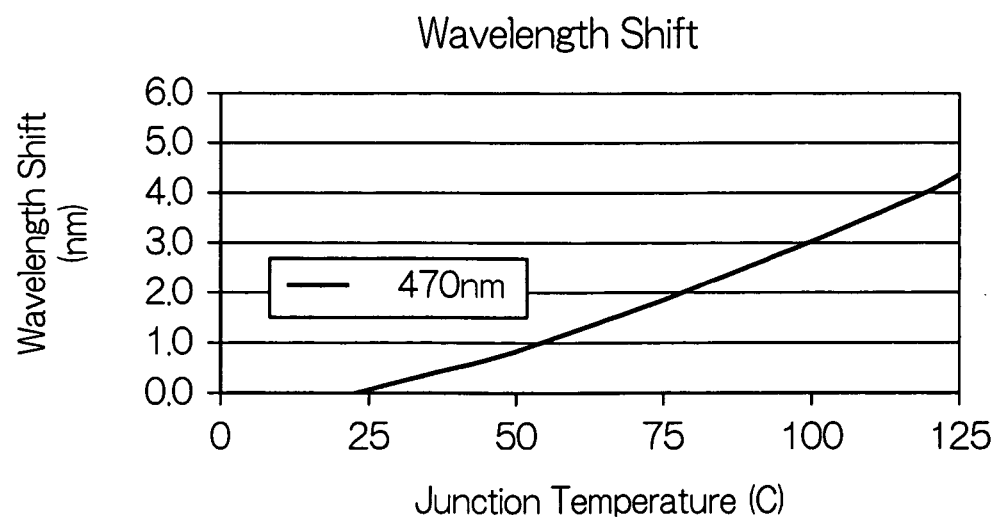
FIG. 10 is a graph showing fluctuation in wavelength as a function of junction temperature for a blue light emitting diode.

FIG. 9 is a graph showing fluctuation in optical output as a function of junction temperature for a blue light emitting diode. FIG. 10 is a graph showing fluctuation in wavelength as a function of junction temperature for a blue light emitting diode. As indicated at these drawings, optical output gradually decreases, and the amount of fluctuation in wavelength gradually increases, with rising junction temperature. Moreover, similar fluctuation also occurs with red and green light emitting diodes.

Furthermore, there is a gradual reduction in optical output with extended use of light emitting diodes, this reduction being especially large for red light emitting diodes.

With the foregoing first or second embodiment, because drive current values would be adjusted almost constantly to correct for such reduction in optical output, reduction in actual optical output would be suppressed to a great extent. But because of the constraint with respect to the magnitude of the lit duty cycle, it is difficult to achieve increased luminance. Furthermore, with the foregoing third embodiment, while it is possible to increase lit duty cycle and achieve increased luminance, because drive current values are adjusted only at the beginning it is difficult to avoid reduction in optical output when lighting takes place over a long period of time or the like. In a fourth embodiment, described below, drive current values are therefore adjusted not only at the beginning but also at fixed time intervals during the course thereof in cyclically periodic fashion. Note that because, except for the features mentioned below, the fourth embodiment is identical to the second embodiment, description will be confined primarily to those aspects that are different therefrom.

Figure 11:
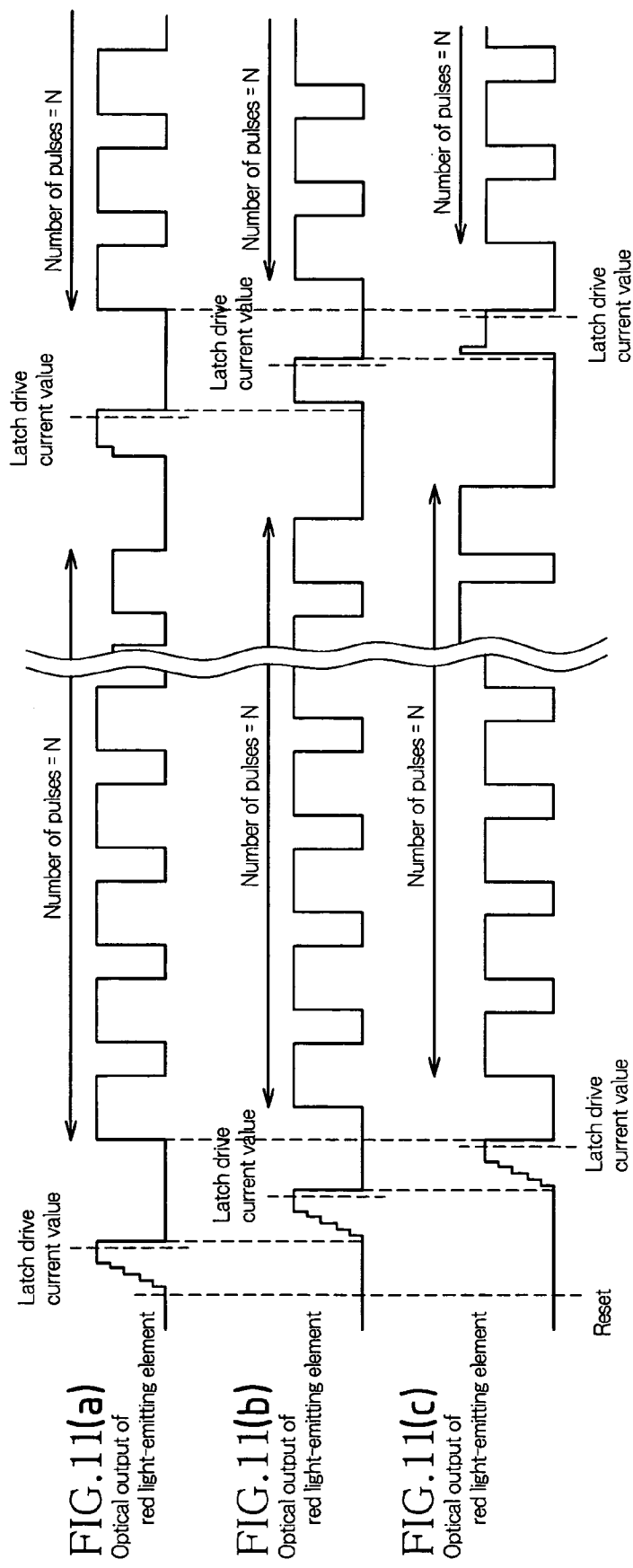
FIG. 11(a) is a timing chart for explaining adjustment of optical output occurring at the start of lighting, as well as pulse drive taking place thereafter, for a red light-emitting element in a light-emitting semiconductor device pulse drive circuit associated with a fourth embodiment of the present invention.
FIG. 11(b) is a timing chart for explaining adjustment of optical output occurring at the start of lighting, as well as pulse drive taking place thereafter, for a green light-emitting element in a light-emitting semiconductor device pulse drive circuit associated with the fourth embodiment of the present invention.
FIG. 11(c) is a timing chart for explaining adjustment of optical output occurring at the start of lighting, as well as pulse drive taking place thereafter, for a blue light-emitting element in a light-emitting semiconductor device pulse drive circuit associated with the fourth embodiment of the present invention.

FIG. 11(a) through (c) are timing charts for explaining adjustment of optical output occurring at the start of lighting, as well as pulse drive taking place thereafter, for light-emitting elements of respective emitted colors in a light-emitting semiconductor device pulse drive circuit associated with the fourth embodiment of the present invention; FIG. 11(a) indicating optical output of a red light-emitting element, FIG. 11(b) indicating optical output of a green light-emitting element, and FIG. 11(c) indicating optical output of a blue light-emitting element.

As shown at FIG. 11(a) through (c), following reset, lighting of the red light-emitting element, adjustment of the optical output thereof, and latching of the drive current value at the point in time when adjustment has been completed are first carried out in that order, following which the red light-emitting element is extinguished. Next, a prescribed unlit time is allowed to pass and similar operations are carried out with respect to the green light-emitting element; and furthermore, a prescribed unlit time is allowed to pass and similar operations are carried out with respect to the blue light-emitting element. At this point, adjustment of optical outputs of light-emitting elements of each respective emitted color will have been completed. Light-emitting elements of respective emitted colors are then each respectively made to emit N pulses of light, with lit duty cycle being ⅔ and phase therebetween being staggered by ⅓ of a period. As drive current values, latched drive current values are respectively restored and used. These modes of operation are thereafter repeatedly carried out in alternating fashion. Note that pulse period(s), pulsewidth(s), emission timing(s), and so forth indicated herein are merely presented by way of example, and the present invention is not limited thereto.

When light emitting diodes are used in a backlight, there is a large change in temperature immediately following initiation of lighting after turning on the power supply, from several minutes to several tens of minutes ordinarily being required for temperature to stabilize. During the period preceding stabilization, because relative fluctuation in chromaticity and optical output as a function of time is large, it is preferred that correction of chromaticity and optical output be carried out at short time intervals. On the other hand, after passage of much time following initiation of lighting, because temperature fluctuation is small, relative fluctuation in chromaticity and optical output as a function of time will also be small. This being so, because at some point it will be the case that even if chromaticity and optical output were to be corrected there would be only a small difference between the value of the setting(s) at that time and the previous value of the setting(s), the time interval at which correction of chromaticity and optical output is carried out may be lengthened.

Figure 12:
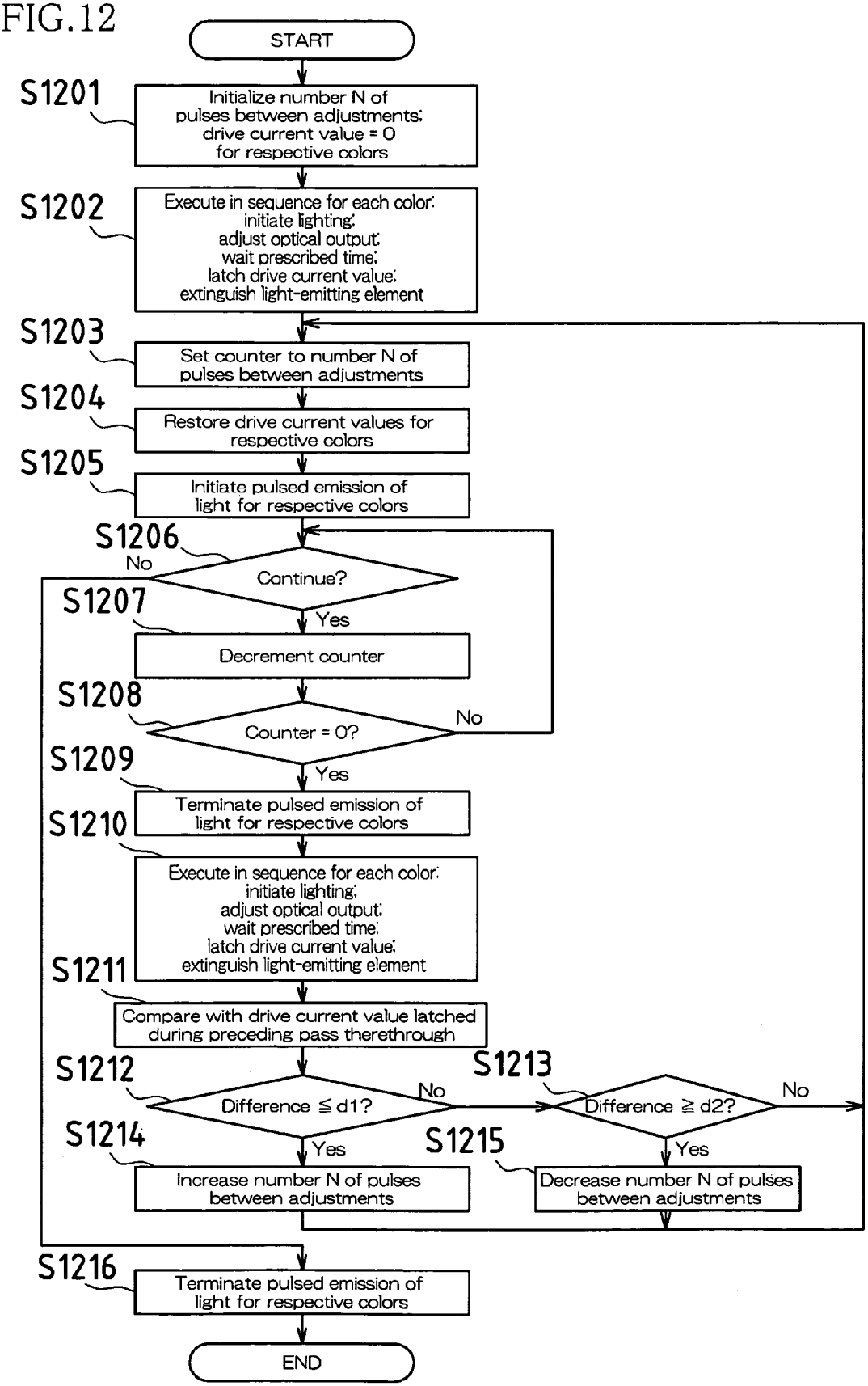
FIG. 12 is a flowchart indicating, in schematic fashion, processing for automatically varying the time interval at which adjustment of optical output is carried out in correspondence to the magnitude of the fluctuation in light-emitting element optical output in a light-emitting semiconductor device pulse drive circuit associated with the fourth embodiment of the present invention.

FIG. 12 is a flowchart indicating, in schematic fashion, processing for automatically varying the time interval at which adjustment of optical output is carried out in correspondence to the magnitude of the fluctuation in light-emitting element optical output in a light-emitting semiconductor device pulse drive circuit associated with the fourth embodiment of the present invention.

As shown in FIG. 12, number N of pulses between adjustments is first initialized to a previously determined value, and drive current values for all colors are initialized to "0" (step S1201).

Initiation of lighting, adjustment of optical output, waiting to allow passage of prescribed time, latching of drive current value, and extinguishing of the light-emitting element are then executed in sequence for each emitted color (step S1202).

A counter is then set to the foregoing number N of pulses between adjustments (step S1203), and drive current values latched for respective colors are restored (step S1204), following which emission of light in pulsed fashion is initiated for respective colors (step S1205).

Upon completion of one round of pulsed emission for each respective color, determination is made as to whether to continue further (step S1206); if continuing, then processing proceeds to step S1207; but if not continuing, then processing proceeds to step S1216, at which pulsed emission is terminated for each color (step S1216) and processing is thereafter terminated.

If continuing, with each pass therethrough the counter is decremented by 1 (step S1207) and determination is made as to whether the counter has reached 0 (step S1208); if 0 has not been reached, then processing returns to step S1206; but if 0 has been reached, then pulsed emission is terminated for each color (step S1209).

Next, as was the case at step S1202, initiation of lighting, adjustment of optical output, waiting to allow passage of prescribed time, latching of drive current value, and extinguishing of the light-emitting element are executed in sequence for each emitted color (step S1210), and moreover, difference(s) is/are determined for comparison with drive current value(s) latched during the preceding pass therethrough (step S1211).

In addition, comparison is first carried out between such difference(s) and first prescribed value d1 (step S1212); if the difference is less than or equal to first prescribed value d1, then processing proceeds to step S1214, where the number N of pulses between adjustments is increased; but if the difference is greater than first prescribed value d1, then processing proceeds to step S1213. At step S1213, comparison is carried out between such difference(s) and second prescribed value d2 (where d1<d2); if the difference is greater than or equal to second prescribed value d2, then processing proceeds to step S1215, where the number N of pulses between adjustments is decreased. Note that if the difference is greater than first prescribed value d1 but less than second prescribed value d2, then the number N of pulses between adjustments will be maintained unchanged. But in any event, processing returns to step S1203, and processing continues therefrom.

In accordance with the fourth embodiment constituted as described above, adjustment of optical output is repeated at short time intervals in situations where relative fluctuation in optical output as a function of time is large, and adjustment of optical output is repeated at long time intervals in situations where relative fluctuation in optical output as a function of time is small. Because the time interval at which adjustment of optical output is carried out can be appropriately shortened and/or lengthened in correspondence to the magnitude of fluctuation in light-emitting element optical output, this makes it possible suppress fluctuation in light-emitting element optical output; and also makes it possible, to a great extent, to avoid lowering of duty cycle during pulse drive.

Moreover, the present invention may be embodied in a wide variety of forms other than those presented herein without departing from the spirit or essential characteristics thereof. The foregoing embodiments, therefore, are in all respects merely illustrative and are not to be construed in limiting fashion. The scope of the present invention being as indicated by the claims, it is not to be constrained in any way whatsoever by the body of the specification. All modifications and changes within the range of equivalents of the claims are, moreover, within the scope of the present invention.

What is claimed is:

1. A pulse drive method for one or more light-emitting semiconductor devices having a plurality of light-emitting elements emitting light at different wavelengths, the light-emitting semiconductor device pulse drive method comprising:

first lit steps in which
at least a portion of the light-emitting elements of any of the emitted wavelengths is or are made to light as a result of being driven at one or more drive settings for each emitted wavelength,
at least one optical output from the lit light-emitting element or elements is detected, and
at least one of the light-emitting element drive setting or settings is adjusted based on at least one of the detected light-emitting element optical output or outputs; and
unlit steps in which the light-emitting elements of all of the emitted wavelengths are unlit for prescribed unlit time, the length of which does not depend on the light-emitting element drive setting or settings;
wherein the first lit steps are carried out in repeated fashion by switching at least a portion of the driven light-emitting element or elements one after another so as to cause at least a portion of the light-emitting elements to sequentially light in pulsed fashion in the order of emitted wavelength such that the plurality of light-emitting elements having different wavelengths are allowed to light up at different timings from each other; and
at least one iteration of the unlit steps respectively intervenes between each pair of successive iterations of the first lit steps carried out in repeated fashion, such that the light-emitting elements of different wavelengths are not lit at the same time.

2. A light-emitting semiconductor device pulse drive method according to claim 1 wherein:
the prescribed unlit time is of shorter length than any time in the first lit steps during which at least a portion of the light-emitting elements is or are lit.

3. A light-emitting semiconductor device pulse drive method according to claim 1 or 2 wherein:
the prescribed unlit time is not less than 30 microseconds in length.

4. A light-emitting semiconductor device pulse drive method according to claim 3 wherein:
the prescribed unlit time is not more than 20 milliseconds in length.

5. A light-emitting semiconductor device pulse drive method according to claim 1 or 2 wherein:
switching of at least a portion of the light-emitting elements driven during the first lit steps occurs within the prescribed unlit time; and
switching of sensitivity of adjustment of at least one of the light-emitting element drive setting or settings carried out based on at least one of the light-emitting element optical output or outputs detected during the first lit steps occurs within the prescribed unlit time.

6. A light-emitting semiconductor device pulse drive method according to claim 1 wherein:
detection of at least one of the optical output or outputs from at least a portion of the light-emitting elements during the first lit steps is carried out by using one or more light-receiving elements to monitor at least one of the optical output or outputs from at least a portion of the light-emitting elements; and
increase and/or decrease of one or more drive currents driving at least a portion of the light-emitting elements is carried out in analog fashion and in real-time so as to cause at least one of the detected light-emitting element optical output or outputs to be constant.

7. A light-emitting semiconductor device pulse drive method according to claim 1 wherein:
detection of at least one of the optical output or outputs from at least a portion of the light-emitting elements during the first lit steps is carried out by using one or more light-receiving elements to monitor at least one of the optical output or outputs from at least a portion of the light-emitting elements; and
increase and/or decrease of one or more drive currents driving at least a portion of the light-emitting elements is carried out in stepwise fashion at one or more prescribed time intervals so as to cause at least one of the detected light-emitting element optical output or outputs to be approximately constant.

8. A light-emitting semiconductor device pulse drive method according to claim 7 further comprising:
storage steps in which information pertaining to at least one drive current at which at least one of the detected light-emitting element optical output or outputs as a result of increase and/or decrease of at least one of the drive current or currents driving at least a portion of the light-emitting elements during the first lit steps is approximately constant is retained and/or stored for each emitted wavelength.

9. A light-emitting semiconductor device pulse drive method according to claim 8 further comprising:
second lit steps in which at least a portion of the light-emitting elements is or are driven in pulsed fashion and is or are made to light based on at least a portion of the drive current information stored for each emitted wavelength at the storage steps.

10. A light-emitting semiconductor device pulse drive method according to claim 9 wherein:
at least a portion of the lit time or times for each emitted wavelength of at least a portion of the light-emitting elements during the second lit steps at least partially overlap.

11. A light-emitting semiconductor device pulse drive method according to claim 9 or 10 further comprising:
drive current adjustment steps having
the first lit steps, same being carried out in repeated fashion for at least one prescribed number of iteration or iterations while at least a portion of the driven light-emitting element or elements is or are switched,
the unlit steps, at least one iteration of which intervenes between each pair of successive iterations of the first lit steps, and
the storage steps;
wherein the drive current adjustment steps and the second lit steps are repeatedly carried out in alternating fashion.

12. A light-emitting semiconductor device pulse drive method according to claim 11 wherein:
the drive current adjustment steps and the second lit steps are repeatedly carried out in alternating fashion with at least one prescribed cyclical periodicity.

13. A light-emitting semiconductor device pulse drive method according to claim 12 wherein:
at least one of the prescribed cyclical periodicity or periodicities is determined based on at least a portion of the drive current information stored at the storage steps.

14. A light-emitting semiconductor device pulse drive method according to claim 13 wherein:
at least a portion of the drive current information stored at the storage steps is compared to drive current information stored at one or more points in time prior thereto; and at least one of the prescribed cyclical periodicity or periodicities is changed based on the results of that comparison.

15. A pulse drive circuit for one or more light-emitting semiconductor devices having a plurality of light-emitting elements emitting light at different wavelengths, the light-emitting semiconductor device pulse drive circuit comprising:
one or more drive circuits sequentially driving at least a portion of the light-emitting elements in pulsed fashion in turn by emitted wavelength at one or more drive currents set for each emitted wavelength;
one or more detection circuits detecting one or more optical outputs from at least a portion of the light-emitting elements; and
one or more setting circuits adjusting one or more drive current settings of at least a portion of the light-emitting elements for each emitted wavelength based on the results of detection carried out by the one or more detection circuits;
wherein the one or more drive circuits respectively allows the plurality of light-emitting elements having different wavelengths to light up at different timings from each other and does not allow the light-emitting elements of different wavelengths to light up at the same time by setting a prescribed unlit time, the length of which does not depend on the one or more drive current settings during which the light-emitting elements of all of the emitted wavelengths are unlit between lit times for each emitted wavelength of the at least a portion of the light-emitting elements.

16. A light-emitting semiconductor device pulse drive circuit according to claim 15 wherein:
at least one of the detection circuit or circuits has at least one light-receiving element;
detection of at least one of the optical output or outputs from at least a portion of the light-emitting elements is carried out by using at least one of the light-receiving element or elements to monitor at least one of the optical output or outputs from at least a portion of the light-emitting elements; and
increase and/or decrease of one or more drive currents driving at least a portion of the light-emitting elements at at least one of the drive circuit or circuits is carried out in stepwise fashion at one or more prescribed time intervals so as to cause at least one of the light-emitting element optical output or outputs detected by at least one of the detection circuit or circuits to be approximately constant.

17. A light-emitting semiconductor device pulse drive circuit according to claim 16 further comprising:
one or more storage circuits retaining and/or storing information pertaining to at least one drive current at which at least one of the light-emitting element optical output or outputs detected by at least one of the detection circuit or circuits as a result of increase and/or decrease of at least one of the drive current or currents driving at least a portion of the light-emitting elements is approximately constant.

18. A light-emitting semiconductor device pulse drive circuit according to claim 17 wherein:
with at least one prescribed cyclical periodicity, at least one of the drive current or currents driving at least a portion of the light-emitting elements is increased and/or decreased so as to cause at least one of the light-emitting element optical output or outputs detected by at least one of the detection circuit or circuits to be approximately constant, and information pertaining to at least one drive current at which at least one of the light-emitting element optical output or outputs detected by at least one of the detection circuit or circuits is approximately constant is stored at at least one of the storage circuit or circuits; and
at least one of the prescribed cyclical periodicity or periodicities is determined based on at least a portion of the drive current information stored at at least one of the storage circuit or circuits.

19. A light-emitting semiconductor device pulse drive circuit according to claim 18 wherein:
at least a portion of the drive current information stored at at least one of the storage circuit or circuits is compared to drive current information stored at one or more points in time prior thereto; and
at least one of the prescribed cyclical periodicity or periodicities is changed based on the results of that comparison.

20. A light-emitting semiconductor device pulse drive circuit according to any one of claims 15 through 19 wherein at least a portion of the light-emitting elements is or are one or more light emitting diodes.

21. A light-emitting semiconductor device pulse drive circuit according to claim 20 wherein the light emitting diode or diodes include one or more light emitting diodes emitting red light, one or more light emitting diodes emitting green light, and one or more light emitting diodes emitting blue light.

* * * * *